Patented Apr. 8, 1952

2,592,317

UNITED STATES PATENT OFFICE 2,592,317

PLASTIC COMPOSITIONS OF ACRYLONITRILE POLYMERS

Pierre Mosse, Lyon, France, assignor to Societe Rhodiaceta, Paris, France

No Drawing. Application February 17, 1951,
Serial No. 211,570
In France November 6, 1950

13 Claims. (Cl. 260—32.6)

This invention relates to plastic compositions of acrylonitrile polymers and has particular relation to new and improved compositions, in which said polymers are dissolved in a new solvent. The invention also relates to the production of filaments, threads, films and similar products from said compositions.

The main object of the present invention is to provide new and improved compositions from polymers of acrylonitrile.

It is also an object of my invention to provide an improved process for producing filaments, threads, films and similar products from acrylonitrile polymers.

Other objects and the advantages of the invention will be apparent from the appended claims and the following specification which describes, by way of example and without limitation, some embodiments of the invention.

It has been known that filaments, threads, films, fibers, molded products and similar articles can be produced by the evaporation of solutions of acrylonitrile polymers in a suitable solvent, such as dimethylformamide, dimethylmethoxyacetamide, N - formylmorpholine and others.

It has now been found that unexpected and improved technical effects are obtained by using for the dissolution of acrylonitrile polymers, mixtures of dimethylformamide with at least one liquid hydrocarbon which is homogeneously miscible with dimethylformamide and has a boiling point higher than 100° C. under atmospheric pressure.

The hydrocarbons which are adapted to be used in carrying out the present invention, may belong to various types of organic compounds. Thus, very good results are obtained with compounds containing 8 carbon atoms or more, of the aliphatic series, for example normal octane, or with compounds of the benzene series, such as xylene, or compounds of the naphthalene series, such as tetrahydronaphthalene. Mixtures of several hydrocarbons may also be used. The amount of hydrocarbon present in the mixture used for dissolving the acrylonitrile polymer, may vary within wide limits.

The solutions embodying my present invention show, particularly at ordinary room temperatures, such as for example 15°–25° C., a substantially lower viscosity than that of compositions of equal concentration, which contain the same polymer dissolved in dimethylformamide alone.

It is remarkable that very small proportions of the hydrocarbon in the mixed solvent, are sufficient for obtaining a considerable reduction of viscosity, and the spinning characteristics of compositions obtained according to the present invention, are at least as good as those of compositions prepared with dimethylformamide only as the solvent. For example, in comparison with a solution containing 15% of a polymer of acrylonitrile dissolved in dimethylformamide alone, solutions containing likewise 15% of the same polymer dissolved (a) in a mixture of 98% of dimethylformamide and 2% of tetrahydronaphthalene and (b) in 98% of dimethylformamide and 2% of xylene, show at 20° C. a viscosity which is 3.35 times lower in the case of composition (a) and 1.7 times lower in the case of composition (b), than the viscosity of said solution in dimethylformamide alone. (The %'s refer to parts by weight.)

Furthermore, in comparison with compositions prepared under equal conditions with dimethylformamide alone, the compositions according to my invention remain in the condition of suspension at much higher temperatures so that they are capable of easier enduring accidental rises of temperature, which may occur during malaxation, conveyance, and the like.

These characteristics of lower viscosity and increased stability represent important advantages in comparison with conventional solutions.

Finally, I have found that in the manufacture of shaped articles such as threads, fibres, films or similar products, the compositions of my invention can be much easier extruded than solutions of acrylonitrile polymers in dimethylformamide alone, and the articles produced from the compositions of my invention show the great advantage that they can be drawn out at relatively low temperatures, even several days after their formation.

The term "acrylonitrile polymers" or "polymers of acrylonitrile" is used in the present specification and claims to denote not only the polyacrylonitrile proper, but also products obtained by copolymerization or interpolymerization of acrylonitrile with other polymerizable substances, such as vinyl halides, vinylidene halides, vinyl esters and ethers, acrylic and methacrylic acids and their derivatives, particularly their amides, styrene, vinylimidazol etc.

In the following examples, the proportions refer to parts by weight.

*Example 1*

The following composition is subjected to spinning according to a conventional method:

240 parts of polyacrylonitrile 760 parts of a solvent containing 98% dimethylformamide and 2% tetrahydronaphthalene A practically colorless filament is obtained, which can be easily drawn to several times its length in boiling water, even after 72 hours storage, and has then very satisfactory properties.

*Example 2*

A homogeneous composition is prepared from the following ingredients:

260 parts of polyacrylonitrile
740 parts of a solvent consisting of 93% of dimethylformamide and 7% of xylene.

By spinning this composition according to a conventional method, an almost colorless filament is obtained, which can be subsequently drawn without difficulty to several times of its length, in water of 95° C.

It will be understood that this invention is not limited to the specific materials, conditions, steps and other specific details described above and can be carried out with various modifications, without departing from the scope of the invention as defined in the appended claims.

The polymers, co-polymers and interpolymers used in carrying out my invention are prepared according to conventional methods, for example by polymerization of the dissolved or emulsified monomeric materials in the presence of a catalyst. I prefer the use of polymers, co-polymers and interpolymers, in which at least about 85% of the polymer is acrylonitrile and the molecular weight of which is in the range of 15,000–250,000 or higher.

What is claimed is:

1. As a new composition, the solution of a plastic consisting of a polymer of acrylonitrile, in a solvent consisting of a mixture of dimethylformamide with a liquid hydrocarbon which is homogeneously miscible with dimethylformamide and has a boiling point above 100° C. under atmospheric pressure, said hydrocarbon being used in an amount of 1 to 20%, based on the total weight of the solvent mixture.

2. As a new composition, the solution of a plastic consisting of a polymer of acrylonitrile, in a solvent consisting of a mixture of dimethylformamide with a liquid hydrocarbon which is homogeneously miscible with dimethylformamide, has a boiling point above 100° C. under atmospheric pressure and is selected from the group consisting of hydrocarbons of the aliphatic series having at least 8 carbon atoms in the molecule, hydrocarbons of the benzene series and hydrocarbons of the nahthalene series, said hydrocarbons being used in an amount of 1 to 20%, based on the total weight of the solvent mixture.

3. A new composition as claimed in claim 1, in which a mixture of several hydrocarbons is used.

4. A new composition as claimed in claim 1, in which the dimethylformamide is used in mixture with octane.

5. A new composition as claimed in claim 1, in which the dimethylformamide is used in mixture with tetrahydronaphthalene.

6. A new composition as claimed in claim 1, in which the dimethylformamide is used in mixture with xylene.

7. A new composition as claimed in claim 1, in which the dimethylformamide is used in mixture with 1 to 20% by weight of octane based on the total weight of the solvent mixture.

8. A new composition as claimed in claim 1, in which the dimethylformamide is used in mixture with 1 to 20% by weight of tetrahydronaphthalene based on the total weight of the solvent mixture.

9. A new composition as claimed in claim 1, in which the dimethylformamide is used in mixture with 1 to 20% by weight of xylene based on the total weight of the solvent mixture.

10. A new composition as claimed in claim 1, in which the dimethylformamide is used in mixture with 2% by weight of tetrahydronaphthalene, based on the total weight of the solvent mixture.

11. A new composition as claimed in claim 1, in which the dimethylformamide is used in mixture with 2–7% by weight of xylene, based on the total weight of the solvent mixture.

12. A new composition as claimed in claim 1, in which the dimethylformamide is used in mixture with 2–7% by weight of octane, based on the total weight of the solvent mixture.

13. A process for producing filaments, films and similar products from plastic compositions containing in solution a plastic consisting of a polymer of acrylonitrile, said process comprising dissolving said plastic in a solvent consisting of a mixture of dimethylformamide with a liquid hydrocarbon which is homogeneously miscible with dimethylformamide and has a boiling point above 100° C. under atmospheric pressure, and subjecting the solution formed to shaping, said hydrocarbon being used in an amount of 1 to 20% of the total weight of the solvent mixture.

PIERRE MOSSE.

REFERENCES CITED

The following references are of record in the file of this patent:

UNITED STATES PATENTS

| Number | Name | Date |
| --- | --- | --- |
| 2,531,409 | D'Alelio | Nov. 28, 1950 |